United States Patent Office 2,977,046
Patented Mar. 28, 1961

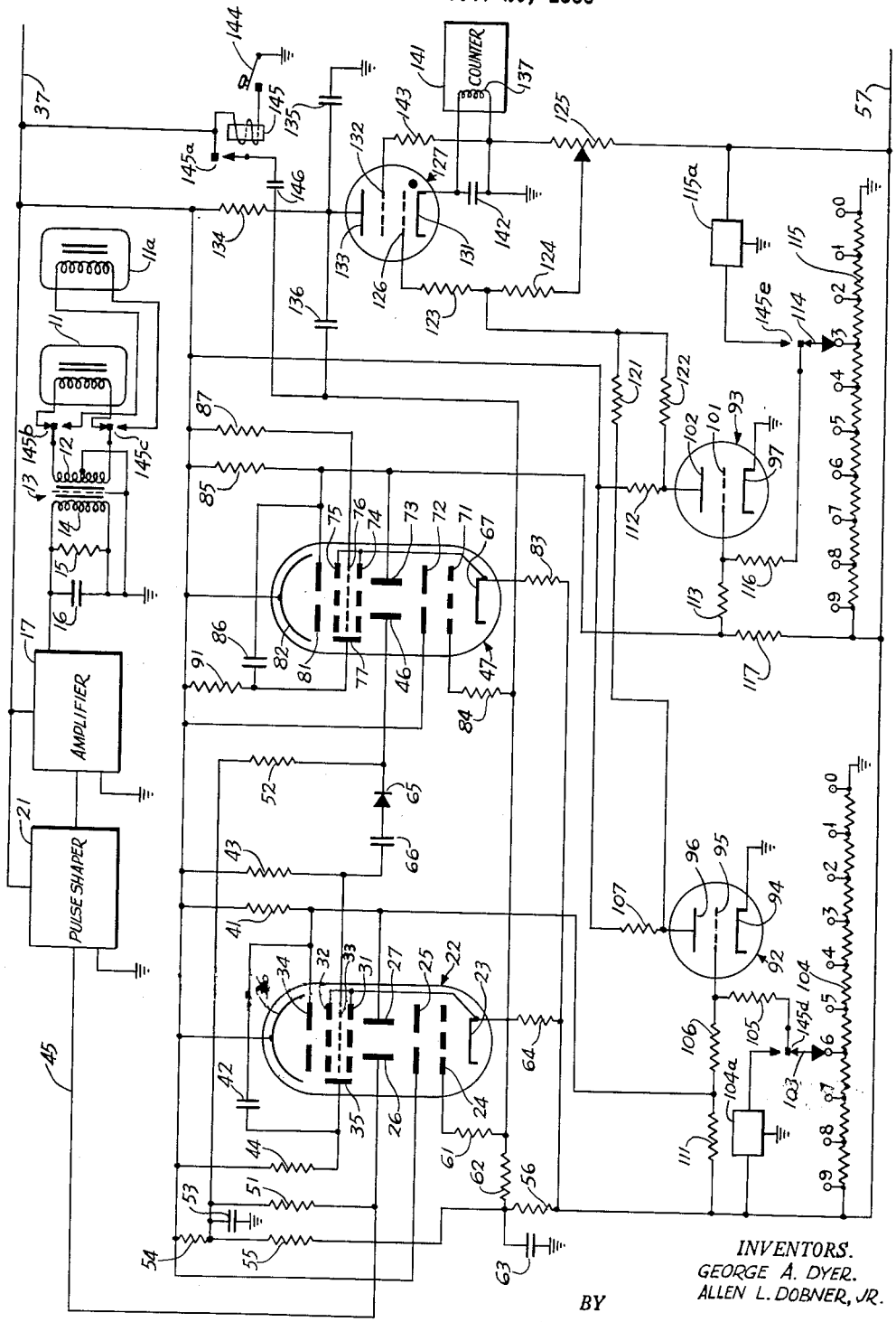

2,977,046

CALIBRATION TRANSLATING DEVICE

Allen L. Dobner, Jr., El Cajon, and George A. Dyer, San Diego, Calif., assignors to General Dynamics Corporation, San Diego, Calif., a corporation of Delaware Filed Oct. 20, 1955, Ser. No. 541,616

13 Claims. (Cl. 235—132)

This invention relates to a translator, and, more particularly, to a device for translating arbitrary electrical impulses representing a physical phenomenon into congruous units, which may be expressed numerically, such as pounds, gallons, grams, or other measurement units.

In many physical measurement systems, transducers translate a physical phenomenon into an electrical signal. Frequently, such electrical signals are in the form of pulse streams, or may be converted thereto in a simple known manner. Such pulse streams usually represent the instantaneous value of the physical phenomenon by the instantaneous pulse frequency, while the total quantity of the phenomenon observed may be represented by the number of pulses generated. However, in order to translate the pulse output into a numerical unit representation, the number of pulses must usually be multiplied or divided by an arbitrary number dependent upon the transducer and the units desired.

In the exemplary embodiment of this invention disclosed hereinbelow, an alternating current output signal from a fluid flow metering device is converted into a pulse stream having the same frequency. The pulse stream is counted and translated into a numerical display indicating the amount of fluid flow in gallons by means of a gated electronic counter driving an electromechanical display device. By means of such an arrangement, the amount of fluid flowing through a pipe may be automatically translated into a numerical indication in terms of the desired units, which may be gallons, liters, pounds or, if desired, the price of the fluid in monetary units.

It is, therefore, an object of this invention to provide a translating apparatus.

Another object of this invention is to provide electrical apparatus for translating an arbitrary signal representing a physical condition into numerical units of mensuration.

Another object of this invention is to provide electrical apparatus for translating an arbitrary series of impulses into numerical mensuration units.

Another object of this invention is to count a stream of impulses arbitrarily proportional to a physical quantity, and actuate an output device employing mensuration units in response to a selected number of arbitrary input pulses.

Another object of this invention is to provide means for translating the arbitrary signal output of a fluid flow transducer into units of quantity.

Another object of this invention is to provide a numerical indication of the flow of fluid by counting the electrical impulses derived from a transducer and actuating a gallons-indicating output device when the number of signals indicating a unit of volume have been counted.

Another object of this invention is to provide an accurate, simple, light, rugged, inexpensive fluid flow translating device.

Various other objects, features and advantages of this invention will become apparent from the following description taken in conjunction with the accompanying drawing, the only figure thereof representing a schematic diagram of an illustrative embodiment of this invention.

Referring now to the drawing, a fluid flow metering device 11, mounted in a fluid conduit (not shown) generates an alternating current signal having a frequency proportional to the rate of fluid flow. A device of this type, disclosed in U.S. Patent No. 2,709,755, entitled "Flow Meter," and issued to D. M. Potter on May 31, 1955, contains a rotor revolved by the fluid stream. A permanent magnet mounted in the rotor induces an alternating voltage in an external coil as the rotor is revolved by the fluid stream. The frequency of the induced alternating voltage is proportional to the rate of fluid flow, and, resultantly, a given quantity of fluid passing through meter 11 causes the generation of a proportional number of cycles of alternating voltage. It will be apparent, therefore, that by counting the number of cycles of alternating voltage generated by the meter, an indication may be obtained of the quantity of fluid passed through the meter. However, in order to obtain an indication of the fluid quantity in terms of congruent units, such as gallons, liters, etc., reference must be made to calibrating tables, or else the number of impulses so obtained must be multiplied by a calibrating constant.

The translating system disclosed herein automatically presents an indication of fluid quantity in terms of the desired units, thereby avoiding the necessity of computation, reference to tables, or other manual steps conducive to error. The indication presented may be in units of quantity, such as gallons or liters, units of weight when the specific gravity of the fluid is known, units of money when the value of the fluid per unit quantity is known, or any desired congruent system of units based on fluid quantity.

Flow meter 11 is connected to center-tapped primary winding 12 of isolating transformer 13. The center tap from winding 12 and an electrostatic shield between the windings are connected to ground. Secondary winding 14 of transformer 13 is connected to a noise filter, including parallel resistor 15 and capacitor 16. The filtered, noise free, alternating voltage is furnished to an amplifier 17, and thence to a pulse shaper 21.

Pulse shaper 21 is connected to a units decade translating stage, including a decade counter tube 22. A decade counter tube suitable for use in connection with this invention is known as the "E1T," described in vol. 14, numbers 1 and 2, of "Electronic Application Bulletin," published by N.V. Phillips' Gloeilampenfabrieken, Eindhoven, Netherlands. Such a decade counter tube includes a cathode 23, a control grid 24, an accelerating electrode 25, left deflection electrode 26, right deflection electrode 27, suppressor grids 31 and 32, a slotted electrode 33, anode 34, reset anode 35, and collector electrode 36.

A suitable power supply (not shown) furnishes a unidirectional positive potential to power supply bus 37. Positive operating potentials are furnished thereby to amplifier 17 and pulse shaper 21 and, to the various electrodes of decade counter tube 22. Collector electrode 36 is connected directly to positive potential bus 37. Anode 34 is connected to bus 37 through a load resistor 41, to right deflection electrode 27, and to reset anode 35 through capacitor 42. Screen electrodes 31 and 32 are internally connected to one another and to cathode 23. Slotted electrode 33 is connected to bus 37 through resistor 43, and to left deflection electrode 46 of tens decade counter tube 47 through capacitor 66 and diode 65. Reset electrode 35 is connected to bus 37 through resistor 44. Left deflection electrode 26 is connected to pulse shaper 21 by means of conductor 45, and to left deflection electrode 46 of tens decade counter tube 47 through resistor 51 and resistor 52. Bypass capacitor 53 is connected between ground and the junction of resistors 51 and 52. Resistor 54 is connected between the junction of resistors 51 and 52, and positive potential bus 37. Resistor 55 is similarly connected between the junction of resistors 51 and 52, and a suitable source of negative unidirectional potential (not shown) through resistor 56 and negative potential bus 57. Accelerating electrode 25 is connected to positive potential bus 37, while control grid 24 is connected to negative potential bus 57 through resistors 61 and 62. A bypass capacitor 63 is connected between the junction of resistors 56 and 62 and ground. Cathode 23 and suppressor electrodes 31 and 32 are connected to negative potential bus 57 through cathode resistor 64.

Tens decade counter tube 47 is similar to units decade counter tube 22. Tens decade counter tube includes a cathode 67, a control grid 71, an accelerating electrode 72, right deflection electrode 73, left deflection electrode 46, suppressor electrodes 74 and 75, slotted electrode 76, reset anode 77, anode 81, and collector electrode 82. Suppressor electrodes 74 and 75 are internally connected to cathode 67, and to negative potential bus 57 through cathode resistor 83.

Control electrode 71 is connected to negative potential bus 57 through resistor 84, resistor 62, and resistor 56. Accelerating electrode 72 is directly connected to positive potential bus 37. Right deflecting electrode 73 is connected to positive potential bus 37 through resistor 85, to anode 81, and to reset anode 77 through capacitor 86. Slotted electrode 76 is connected to positive potential bus 37 through resistor 87. In addition to connection to anode 81 through capacitor 86, reset anode 77 is connected to positive potential bus 37 through resistor 91. Accelerating electrode 72 is directly connected to positive potential bus 37.

The output signal from counter tubes 22 and 47 are applied to gate circuits including electron discharge devices 92 and 93, respectively. Discharge devices 92 and 93 may conveniently be high vacuum triodes, but other known types of gate devices, such as diodes, pentodes, gas filled tubes, or solid state devices such as crystal diodes or transistors may be employed if desirable. In the embodiment of this invention disclosed herein, electron discharge devices 92 and 93 are high vacuum triodes. Triode 92 includes a cathode 94, a control electrode 95, and an anode 96. Similarly, triode 93 includes a cathode 97, control electrode 101 and anode 102.

Control electrode 95 of tube 92 is connected to a count control circuit including wiper 103, cooperating with tapped potentiometer 104 through resistor 105. Control electrode 95 is also connected to anode 34 of counter tube 22 through resistor 106, and to negative potential bus 57 through bias resistor 111. Cathode 94 is directly connected to ground, an anode 96 is connected to positive potential bus 37 through load resistor 107. Resistor 104 is connected to negative potential bus 57 at one end, and to ground at the other end thereof. Resistor 104 may be a single resistor having ten taps suitably spaced apart to provide the desired voltages, or may comprise a group of individual resistors serially connected.

The circuit interconnections of discharge device 93 are similar to the connections disclosed hereinabove in connection with discharge device 92. Cathode 97 is connected to ground, and anode 102 is connected to positive potential bus 37 through load resistor 112. Control electrode 101 is connected to anode 81 of counter tube 47 through resistor 113, and, through resistor 116, to the count control circuit including wiper 114 of tapped resistor 115. Control electrode 101 is additionally connected to negative potential bus 57 through resistor 113 and a resistor 117. Wiper 103 of resistor 104 and wiper 114 of resistor 115 of the count control circuit are illustrated herein as being manually adjustable. However, it will be apparent to those skilled in the art that wipers 103 and 114 may be automatically positioned by known means in response to another variable. Exemplarily, wipers 103 and 114 may be suitably positioned proportional to the speed of a vehicle and flow meter 11 may be placed to meter the flow of fuel to an engine. As a result, an indication may be obtained of the rate of fuel consumption by the vehicle in terms of miles per gallon. Thus, automatically positioning wipers 103 and 114 in response to other physical conditions may be employed to provide an indication of one physical condition in terms of another.

Anode 96 of gate tube 92 is connected to resistor 121, forming part of a summing circuit. Similarly, anode 102 of gate tube 93 is connected to resistor 122, forming another part of said summing circuit. Summing resistors 121 and 122 are connected to a voltage divider comprising resistors 123 and 124, and a selected portion of potentiometer 125. Resistor 123 is connected to control electrode 126 of output-driving electron discharge device 127. In addition to control electrode 126, electron discharge device 127 includes a cathode 131, a screen electrode 132, and an anode 133. Electron discharge device 127 is preferably a gas filled tube of the thyratron type, although other suitable output driving means, such as relays, are contemplated in connection with this invention.

Anode 133 of thyratron 127 is connected to positive potential bus 37 through anode resistor 134. Anode 133 is also connected to ground through extinguishing capacitor 135. Anode 133 is also connected to the count control circuit reset capacitor 136, to the control electrodes 71 and 24 of counter tubes 47 and 22 by means of their respective control electrode resistors 84 and 61. A direct current path is provided from cathode 131 to ground through actuating coil 137 in electro-mechanical counter 141. Bypass capacitor 142 is provided in parallel with coil 137 in order to bypass unwanted transient signals to ground. Screen electrode 132 is connected to ground through resistor 143.

As disclosed hereinabove, fluid flow metering device 11 generates an alternating voltage having a frequency directly proportional to the rate of fluid flow. That is each cycle of alternating voltage represents the flow through the metering device of a known amount of fluid. The alternating voltage generated by the metering device is applied to primary winding 12 of isolating transformer 13. Primary winding 12 has a center tap connected to ground, and a grounded electrostatic shield is imposed between primary winding 12 and secondary winding 14, thereby eliminating much undesired electrical noise. Undesired electrical noise is further reduced by the filter circuit including resistor 15 and capacitor 16. The noise-free signal from the metering device is amplified by amplifier 17. Pulse shaper 21 converts the amplified alternating voltage into a pulse train of the same frequency as the alternating voltage generated by the metering device. Amplifier 17 and pulse shaper 21 may both be of any suitable type well known to the art, and do not constitute a part of this invention. Exemplarily, a suitable amplifier is disclosed on page 68, and a suitable pulse shaper is disclosed on page 416 of "Electron Tube Circuits," first edition, by Samuel Seely, published by McGraw Hill Book Company, Inc. in 1950. An alternative pulse shaper is disclosed on page 16 of the hereinabove referenced N.V. Philips' Gloeilampenfabrieken publication.

Output pulses from pulse shaper 21 are applied to left deflection electrode 26 of units decade counter tube 22. As disclosed in great detail in the hereinabove mentioned publication, a positive polarity pulse applied to left deflection plate 26 steps an electron beam from its quiescent position at the right, zero-representing position to the one-representing position on slotted electrode 33. A second pulse steps the electron beam to the two-representing position on slotted electrode 33, the third pulse to the three-representing position, etc. There are ten stable points of operation. Upon application of suitable pulses to left deflection electrode 26 of counter tube 22, the electron beam moves from right to left in nine steps, starting from the zero position. After nine pulses have been applied and counted, the electron beam is shifted to impinge upon reset anode 35 by the tenth pulse. A negative-going pulse is caused by the electron stream flowing through resistor 44. The negative pulse induces a corresponding positive pulse through capacitor 42, which is applied to anode 34 and to right deflection electrode 27, thereby attracting the electron beam to its extreme right-hand, zero-representing position. Simultaneously, a pulse is generated upon slotted electrode 33, filtered by capacitor 66 rectified by rectifier 65, and applied to left deflection electrode 46 of tens decade counter tube 47, thereby enabling a tens carry. Resistors 41, 43, 51, 54, 56, 62 and 64, and capacitors 53 and 63 serve to apply the proper operating potentials to the various electrodes of counter tube 22, and to filter out undesired transient signals in a manner well understood by those skilled in the art.

An output signal indicative of the position of the electron beam, and thus of the number of pulses counted by the tube, is taken from anode 34 and right deflection electrode 27 and applied to control electrode 95 of gate tube 92 through resistor 106. The output count-indicating signal from counter tube 22 is in the form of a step voltage, comprising a distinct voltage level associated with each count at right deflection electrode 27. Exemplarily, a positive potential of 250 volts may represent zero, 235 volts represents 1, 220 volts represents 2, 205 volts represents 3, and so forth in 15 volt increments. The count-representing positive voltage from counter tube 22 is applied to resistor 106, which, together with resistor 105, forms a voltage summing circuit. In addition, a negative voltage, selected by the position of adjustable wiper 103 along tapped resistor 104 is applied to summing resistor 105. As will be apparent, each position of wiper 103 applies a distinct, numeral representing negative potential to summing resistor 105.

Tube 92 is normally in the conductive state when counter tube 22 indicates a zero count due to the positive potential applied to control electrode 95 through summing resistor 106 by anode 34 of the counter tube. The negative potential applied to control electrode 95 by tapped calibrating potentiometer 104 through wiper 103 and summing resistor 105 bucks the count-representing positive potential. Thus, as the count-representing potential is lowered as pulses are counted, tube 92 will cease conducting when counter tube 22 reaches the count selected by the position of wiper 103 on resistor 104. As is well known to those skilled in the art, when tube 92 cuts off, the potential of anode 96 rises to substantially the potential of positive power supply bus 37, thus increasing the voltage at summing resistor 121.

Tens decade counter tube 47, gate tube 93 and the count control means associated therewith operate in a manner similar to that disclosed hereinabove in connection with units counter tube 22, gate tube 92, and resistor 104. As units counter tube 22 is actuated by the tenth pulse, it is reset to zero and a pulse is applied to left deflection electrode 46 of tens counter tube 47, stepping the electron beam therein once to the ten-indicating position. Similarly, the twentieth pulse resets units counter tube 22 to zero and steps tens counter tube 47 to the twenty-indicating position.

It will be noted in the accompanying drawing that the wipers 103 and 114 of tapped resistors 104 and 115 are set to the "6" and "3" taps respectively.

When the taps are placed in these exemplary positions, one count will be recorded by electro-mechanical counter 141 for 36 revolutions of fluid flow meter 11. Thus, if the passage of one gallon of fluid rotates flow meter 11 by 36 revolutions, electro-mechanical counter 141 is caused to advance one count for each 36 revolutions of flow meter 11, thereby counting and displaying the quantity of fluid measured by meter 11 directly in terms of gallons.

It will be apparent from the foregoing, therefore, that the thirtieth revolution of fluid flow meter 11 steps the electron beam of tens counter tube 47 to the third position, and lowers the positive voltage applied by anode 81 to control electrode 101 of gate tube 93 to a value sufficiently low as to enable the negative voltage applied thereto through tapped resistor 115 to cut off gate tube 93, increasing the voltage at summing resistor 122. Since gate tube 92 is cut off at each unit count of six, it will be seen that, at the count of 36, both of gate tubes 92 and 93 are cut off. At this time, the positive voltages applied to summing resistors 121 and 122 are increased by an amount sufficient to overcome the negative bias voltage applied to control electrode 126 by negative potential bus 57 through potentiometer 125. The positive potential is sufficient to cause thyratron 127 to conduct, causing space current to flow through actuating coil 137 of electro-mechanical counter 141, thereby moving the counter one step. In the embodiment disclosed herein, counter 141 will now display a 1, indicating that one gallon has flowed through fluid flow meter 11.

The drop in anode voltage caused by space current flowing through high resistance anode resistor 134 is sufficient to lower the potential at anode 133 to a value below the sustaining voltage required for the tube to continue to conduct. However, capacitor 135 is large enough to store a charge sufficient to maintain conduction for the length of time required to actuate counter 141, and to reset counter tubes 22 and 47 to the zero position.

Counter tubes 22 and 47 are reset to zero by means of a reset circuit which applies a negative-going pulse to control grids 24 and 71. The negative reset pulse is obtained by negatively charging reset capacitor 136 through series resistor 62 from negative potential bus 57, and is applied to control grid 24 through resistor 61 and to control grid 71 through resistor 84. Gate tubes 92 and 93 resume the conducting state after counter tubes 22 and 47 are reset to zero and thyratron 127 cuts off in the manner disclosed hereinabove. The time required for firing thyratron 127, actuating counter 141 and resetting counter tubes 22 and 47 is much shorter than the period between input pulses. Therefore, it will be apparent from the illustrated example that an additional unit is displayed by counter 141 for each 36 revolutions of the rotor of flow meter 11. Since it is assumed that 36 revolutions of the rotor of flow meter 11 indicate the flow of one gallon of fluid through the flow meter, counter 141 will therefore, accurately and continuously indicate the number of gallons of fluid which have flowed through flow meter 11. On the other hand, if a subtracting type of electro-mechanical counter 141 is pre-set to indicate the quantity of fluid in a tank, and flow meter 11 is placed in the outlet pipe, the counter will continuously indicate the amount of fluid remaining in the tank.

Although counter 141 indicates gallons in the example discussed, other units of measurement may be indicated thereupon by suitable repositioning of wipers 103 and 114 along tapped resistors 104 and 115, respectively, either automatically or manually, as disclosed hereinabove. Quarts will be indicated by counter 141 by setting tens wiper 114 at zero and units wiper 103 at 9, liters by setting the wipers to 11, and other units may be indicated, as desired, by changing the positions of wipers 103 and 114. In addition, if flow meter 11 is replaced, or changes calibration, it may be re-calibrated by changing the position of wipers 103 and 114 to the required taps. Higher resolution may be obtained merely by adding additional counter tube stages and inserting a decimal point in the indication presented on counter 141 at the proper place.

Means are included in this invention whereby a plurality of flow meters, or other transducers, may be employed in conjunction with the translating device disclosed herein, whereby switching from one transducer to another transducer having a different cycles-per-quantity characteristic automatically changes the calibration of the translating device. For example, when measuring the flow of fuel to a jet engine equipped with an afterburner, it is necessary to employ two fuel flow meters, one to accurately measure the relatively small flow of fuel to the engine alone, and a larger flow meter to accurately measure the much greater flow of fuel to both the engine and afterburner. It is customary to employ a small diameter fuel line to supply fuel to the engine, and to switch to a large diameter fuel line to supply fuel to both the engine and afterburner when the pilot turns on the afterburner.

Under normal operating conditions, a small flow meter 11 will be positioned in the small fuel line, furnishing the input signal to the translating device disclosed herein. Wipers 103 and 114 of potentiometers 104 and 115, respectively, are set to enable translation of the cycles per quantity characteristic of flow meter 11 into an indication of quantity in mensuration units on indicator 141. When the afterburner is switched on, the larger fuel line is connected, and a larger capacity flow meter 11a in the large fuel line is automatically connected in the circuit in place of small flow meter 11. Inasmuch as the cycles per quantity characteristic of large flow meter 11a differs from that of small flow meter 11, it is necessary to provide count control circuits calibrated to provide the required count characteristic. A tapped resistor 104a, similar to tapped resistor 104, but with the wiper associated therewith (not shown) set to the required units calibration for the large meter, is automatically substituted in the circuit when the afterburner is switched on by the pilot. Similarly, a tapped resistor 115a is automatically substituted in the circuit for resistor 115 in the tens decade when the afterburner is switched on.

Switch 144, which may conveniently be part of the afterburner switch, completes the circuit from positive potential bus 37 to ground through relay 145, thereby actuating relay 145. Contacts 145a on relay 145 are closed, actuating a reset circuit further described hereinbelow, contacts 145b and 145c on relay 145 are actuated, switching large flow meter 11a into circuit in place of small flow meter 11, contacts 145d on the relay 145 switch tapped control resistor 104a into circuit with units gate tube 92 in place of tapped resistor 104, and contacts 145e on the relay switch tapped control resistor 115a into circuit with tens gate tube 93 in place of tapped resistor 115.

Counter tubes 22 and 47 must be reset to zero count when switching from small flow meter 11 to large flow meter 11a. The relay-actuated reset circuit includes series capacitor 146 cooperating with resistors 62 and 56, and decade counter tube control grid resistors 61 and 84. Application of positive potential from positive bus 37 to capacitor 146 by relay contacts 145a induces a negative potential pulse which is applied to control grids 24 and 71 by resistors 61 and 84, respectively, resetting counter tubes 22 and 47 to zero in preparation for counting impulses from flow meter 11a.

As will be apparent from the foregoing, operation of the afterburner switch (not shown) automatically switches the engine to a larger fuel line including large flow meter 11a. Operation of the afterburner switch also closes switch 144, substituting large flow meter 11a for small flow meter 11 in the circuit, and substituting resistors 104a and 115a for resistors 104 and 115 to provide the proper calibration of the translating device for the large flow meter, thereby enabling counter 141 to continue to provide an indication of total quantity of fuel flow in the same mensuration units for both flow meters.

Although the embodiment of this invention disclosed herein employs a single counter tube for each decade, other counting means may be employed. A binary decade counter may be employed, which may utilize vacuum tubes, gas tubes, semi-conductor devices, saturable core devices, relays or other suitable pulse counting devices, as will be apparent to those skilled in the art. Similarly, the employment of other gating means is contemplated in connection with this invention. Relays or semi-conductors may be employed in connection with tapped potentiometers, or a matrix may be used in conjunction with a multi-position switch as gates and calibrating devices. Although this invention has been disclosed in connection with a specific fluid flow meter, it will be apparent that many other transducer devices furnishing an output signal capable of conversion to a pulse stream of variable frequency may be employed as input devices in conjunction therewith. Although an electro-mechanical counter is disclosed herein as an indicator for totalling and displaying the number of units of fluid flowing through the flow meter, it will be apparent that the output pulses from thyratron 127, each pulse representing the passage of a unit amount of fluid through flow meter 11, may be applied to additional data processing apparatus instead of to counter 141 or in addition thereto.

It will be apparent from the foregoing, therefore, that herein has been disclosed a novel translating device. A pulse stream having a frequency proportional to the magnitude of a physical phenomenon is translated into units of mensuration. The number of pulses transmitted are counted. Since a known number of pulses correspond to the desired mensuration unit, gate circuits are actuated when the required number of pulses are counted. The gates are actuated when the step voltages produced by the counters have a required relation to voltages selected by tapped voltage dividers. The gates fire a thyratron, which in turn actuates a mechanical counter, which is advanced one unit, indicating one mensuration unit.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. Apparatus for providing a quantitative indication of fluid flow, said apparatus comprising flow meter means for producing impulses representing a measure of fluid flow, counting means for registering said impulses, a gate connected with said counting means, control means for selectively conditioning said gate to produce an output indication at different impulse conditions registered by said counting means, a reset circuit responsive to said output indication for resetting said counting means to a predetermined condition, and an output circuit responsive to said output indication for delivering a quantitative indication of fluid flow.

2. Apparatus for providing a numerical indication of fluid flow, said apparatus comprising flow meter means for producing a predetermined number of impulses representing a unit quantity of fluid flow, counting means for registering said impulses, a gate connected with said counting means, variable control means for selectively conditioning said gate to produce an output indication at said predetermined number of impulses registered by said counting means, a reset circuit responsive to said output indication for resetting said counting means to a predetermined condition, and indicating means responsive to said output indication for providing a numerical indicaton of fluid flow.

3. Translating apparatus comprising means for producing electrical impulses in response to predetermined physical conditions, a pulse counter including a decade counter tube responsive to said impulses, a gate responsive to said decade counter tube, control means for selectively conditioning said gate to respond to a predetermined number of said impulses, a reset circuit responsive to said gate for resetting said decade counter tube after said predetermined number of impulses, and output means responsive to said gate for providing a quantitative indication of said physical condition.

4. A fluid flow indicating system comprising a plurality of flow meters each producing impulses representing a quantity of fluid flow therethrough, counting means for registering said impulses, a gate connected with said counting means, control means associated with each flow meter which produces a different impulse value per quantity of fluid flow for selectively conditioning said gate whereby an output indication is produced at different impulse conditions registered by said counting means, switching means for selectively switching a flow meter and associated control means in circuit with said counting means and said gate, respectively, a reset circuit responsive to said output indication for resetting said counting means to a predetermined condition, and an indicator responsive to said output indication for providing a numerical indication of fluid flow through said meter.

5. A fluid flow indicating system comprising a plurality of flow meters, each of said flow meters having a predetermined cycles per quantity characteristic for producing a signal representing a quantity of fluid flow, means for converting said signal into electrical impulses, counting means for registering said impulses, a gate connected with said counting means, control means associated with each of said flow meters for selectively conditioning said gate in accordance with said cycles per quantity characteristic whereby an output indication is produced at a predetermined number of impulses registered by said counting means, switching means for selectively switching a flow meter and associated control means in circuit with said counting means and said gate, respectively, a reset circuit responsive to said output indication for resetting said counting means to a predetermined condition, and an output device responsive to said output indication for providing a numerical indication of fluid flow.

6. Translating apparatus comprising means for producing electrical impulses in response to predetermined physical conditions, a pulse counter responsive to said impulses, a gate responsive to said pulse counter, control means for selectively conditioning said gate to respond to a predetermined number of said impulses, a reset circuit responsive to said gate for resetting said pulse counter after said predetermined number of impulses, output driving means responsive to said gate, and an electro-mechanical counter responsive to said output driving means for providing a quantitative indication of said physical condition.

7. Apparatus for providing a quantitative indication of fluid flow, said apparatus comprising a flow meter having a predetermined cycles per quantity characteristic for producing a signal representing a quantity of fluid flow, means for converting said signal into electrical impulses, counting means for registering said impulses, a gate connected with said counting means, variable control means for selectively conditioning said gate in accordance with said cycles per quantity characteristic of said flow meter to produce an output indication at a predetermined number of impulses registered by said counting means, a reset circuit responsive to said output indication for resetting said counting means to a predetermined condition, and an output circuit responsive to said output indication for delivering a quantitative indication of fluid flow.

8. Translating apparatus comprising a transducer and a pulse shaper for producing electrical impulses in response to predetermined physical conditions, a counter for producing voltages proportional to a number of impulses applied thereto, a control circuit, said control circuit including generating means for producing a plurality of voltages and selecting means for selecting a voltage of said plurality of voltages representing a number, a gate responsive to said counter and to said control circuit, said gate being arranged to change condition when a voltage produced by said counter bears a predetermined relation to the selected voltage selected by said selecting means, output means connected to said gate for delivering a digital indication of said physical conditions, and a reset circuit responsive to said gate for generating an impulse to reset said decade counter tube to zero.

9. Translating apparatus comprising means for producing electrical impulses in response to predetermined physical conditions, a decade counter tube responsive to said impulses for generating a step voltage representing a number of impulses registered by said counter tube, a gate circuit responsive to said step voltage, a variable source of voltage applied to said gate for selective activation thereof at a predetermined level of said step voltage, a reset circuit responsive to said gate for resetting said decade counter tube after a predetermined number of impulses, and output means responsive to said gate for providing a quantitative indication of said physical condition.

10. Translating apparatus comprising a fluid flow meter having a predetermined cycles per quantity characteristic for producing a signal representing a quantity of fluid flow, a pulse shaper for converting said signal into electrical impulses, a decade counter tube for registering said impulses and producing a voltage level proportional to the number of said impulses registered, a source of voltage and a voltage divider for developing a plurality of voltage levels, a multi-position switch for selecting one of said plurality of voltage levels, a gate connected with said decade counter tube and said switch and arranged to change its conductive condition in response to a predetermined relationship between a voltage level produced by said decade counter tube and a voltage level selected by said switch, output means responsive to the change of condition of said gate for delivering a quantitative indication of fluid flow, and a reset circuit responsive to the change of condition of said gate for generating a reset impulse to reset said decade counter tube to zero.

11. A fluid flow indicating system comprising flow meter means for producing electrical impulses representing a quantity of fluid flow, a counter for registering said impulses and producing a voltage level proportional to the number of said impulses registered, a control circuit including generating means for producing a plurality of voltage levels and selecting means for selecting one of said plurality of voltage levels, an electron discharge device having a control electrode connected to said counter and to said control circuit and arranged to change its conductive condition in response to a predetermined relationship between the voltage level produced by said counter and the voltage level selected by said selecting means, output means responsive to a change of conductive conditions of said electron discharge device for delivering a quantitative indication of fluid flow, and a reset circuit responsive to the change of condition of said gate for generating a reset pulse to reset said decade counter tube to zero.

12. A fluid flow indicating system comprising a fluid flow meter for producing a signal having a predetermined cycles-per-quantity characteristic representing fluid flow, a pulse shaper for converting said signal into electrical impulses, a counter for registering said impulses and producing a voltage proportional to the number of said impulses registered, control means including a voltage divider for developing a plurality of voltages and a multi-position switch for selecting one of said plurality of voltages corresponding to said cycles-per-quantity characteristic of said flow meter, an electron discharge device having a control electrode connected to said counter and to said switch and arranged to change condition in response to a predetermined relationship between voltages produced by said counter and selected by said multi-position switch, a reset circuit responsive to conditions of said electron discharge device for generating an impulse to reset said counter to zero, and an indicator responsive to conditions of said electron discharge device for producing a numerical indication of fluid flow.

13. A fluid flow indicating system comprising a fluid flow meter for producing a signal having a predetermined cycles-per-quantity characteristic representing fluid flow, a pulse shaper for converting said signal into electrical impulses, counting means comprising a plurality of decade counters for registering said impulses, each of said decade counters producing a voltage proportional to the number of said impulses registered thereby, control means associated with each of said decade counters, each of said control means including a voltage divider for developing a plurality of voltages and a multi-position switch for selecting one of said plurality of voltages corresponding to the cycles-per-quantity characteristic of said flow meter, a gate associated with each of said decade counters, each of said gates including an electron discharge device having a control electrode connected to the associated decade counter and to said multi-position switch associated therewith and arranged to change condition in response to a predetermined relationship between voltages produced by said decade counter and selected by said multi-position switch, a reset circuit responsive to conditions of said electron discharge devices for generating an impulse to reset said counter to zero, and an indicator responsive to conditions of said electron discharge devices for producing a numerical indication of fluid flow.

References Cited in the file of this patent

UNITED STATES PATENTS

| | | |
|---|---|---|
| 2,432,292 | Deal | Dec. 9, 1947 |
| 2,521,774 | Bliss | Sept. 12, 1950 |
| 2,619,282 | Manley | Nov. 25, 1952 |
| 2,683,224 | Cole | July 6, 1954 |
| 2,725,550 | Prior | Nov. 29, 1955 |
| 2,807,419 | Rabenda | Sept. 24, 1957 |
| 2,892,526 | Devaud | June 30, 1959 |